United States Patent [19]

Roncato et al.

[11] Patent Number: 5,011,523

[45] Date of Patent: Apr. 30, 1991

[54] PROCESS AND DEVICE FOR PRODUCING A YARN OR RIBBON FORMED FROM REINFORCEMENT FIBERS AND A THERMOPLASTIC ORGANIC MATERIAL

[75] Inventors: Giordano Roncato; Robert Federowsky, both of Aix les Bains, France

[73] Assignee: Vetrotex Saint Gobain, Chamberry, France

[21] Appl. No.: 428,379

[22] Filed: Oct. 27, 1989

[30] Foreign Application Priority Data

Oct. 28, 1988 [FR] France ................. 88 14104

[51] Int. Cl.$^5$ ......................................... C03B 37/022
[52] U.S. Cl. ............................................. 65/2; 65/4.3;
57/249; 264/211.12; 264/171; 264/174;
428/374; 428/394
[58] Field of Search ............... 65/2, 4.3; 428/374,
428/394; 57/249; 156/175, 441; 264/211.12,
171, 174

[56] References Cited

U.S. PATENT DOCUMENTS

| | | | |
|---|---|---|---|
| 3,019,078 | 1/1962 | Roberson | 65/4.3 |
| 3,091,018 | 5/1963 | Rees | 428/394 |
| 3,134,704 | 5/1964 | Modigliani | 65/4.3 X |
| 3,265,482 | 8/1966 | Langlois et al. | 65/9 |
| 3,620,701 | 11/1971 | Janetos et al. | 65/3.44 |
| 3,628,931 | 12/1971 | Russell | 264/211.14 X |
| 3,899,562 | 8/1975 | Seidl | 264/210 F |
| 4,233,363 | 11/1980 | Cemel et al. | 428/374 X |
| 4,292,365 | 9/1981 | Kane et al. | 428/394 X |
| 4,537,610 | 8/1985 | Armstrong et al. | 65/3.44 |
| 4,539,249 | 9/1985 | Curzio | 428/175 |
| 4,614,678 | 9/1986 | Ganga | 428/74 |
| 4,713,139 | 12/1987 | Ganga | 156/500 |
| 4,800,113 | 1/1989 | O'Connor | 428/175 |
| 4,863,502 | 9/1989 | Schlachter | 65/4.3 |

FOREIGN PATENT DOCUMENTS

| | | |
|---|---|---|
| 243275 | 10/1987 | European Pat. Off. . |
| 2167771 | 8/1973 | France . |
| 2067612 | 1/1981 | United Kingdom . |
| 2105247 | 6/1981 | United Kingdom . |

Primary Examiner—Robert L. Lindsay
Attorney, Agent, or Firm—Pennie & Edmonds

[57] ABSTRACT

The invention relates to an apparatus and process for the direct production of a composite yarn or ribbon of continuous reinforcement fibers and a thermoplastic organic material. The process includes drawing reinforcement fibers from molten glass, driving or extruding a thermoplastic organic material, converging the paths followed by the reinforcement fibers and the organic material toward one another, and joining the organic material and fibers in at least one composite yarn or ribbon. An apparatus for conducting this process is also disclosed.

23 Claims, 3 Drawing Sheets

PROCESS AND DEVICE FOR PRODUCING A YARN OR RIBBON FORMED FROM REINFORCEMENT FIBERS AND A THERMOPLASTIC ORGANIC MATERIAL

TECHNICAL FIELD

The invention relates to the direct production of a composite yarn or ribbon consisting of continuous reinforcement fibers and a thermoplastic organic material.

BACKGROUND OF THE INVENTION

The association of reinforcement fibers and organic material to achieve a finished composite product can be performed in many ways. This composite product should exhibit in particular the properties required for the contemplated application. Its properties, in particular its mechanical properties, are a function of the quality of the bond that exists between the organic material and the fibers that reinforce it. One of the numerous means contributing to obtaining this result is the prior coating of the fibers with an organic material identical, or at the very least compatible, with that which will form the mass of the finished product. There are numerous methods for coating reinforcement fibers which are used independently of the process of producing said fibers. These coating methods require an additional operation and have, among other drawbacks, that of increasing the production cost of the yarn.

To avoid the drawbacks of the indirect processes, other processes advocate coating the fibers at the time of their production. These direct processes are inspired by the means traditionally used to coat the surface of fibers with a finish. The device for application of this finish is installed in the path traveled by the fibers between their forming zone and the zone where they are collected in one form or another.

U.S. Pat. No. 4,537,610, relating to the production of continuous glass fibers, describes an installation which is exemplary in this regard. A die, heated by Joule effect, is fed molten glass streams which flow through a multiplicity of orifices placed at the base of the die. The streams, after mechanical drawing, give rise to a multiplicity of continuous fibers which are assembled in a single yarn. A coating device is installed between the base of the die and the point of assembling the fibers. This device comprises a tank, fed with a thermoplastic organic mixture in the molten state, and a roller which is partially immersed in the organic material and partially in contact with the advancing fibers. The roller, in rotation around its axis, drives on its surface an organic film picked up by the fibers during their passage. This type of process, although advantageous, still exhibits a certain number of constraints.

It would be advantageous to obtain directly a composite yarn in which the amount of organic material is high relative to the weight of said yarn. According to direct processes known at present, the weight by percent of the organic material retained by the yarn is greater at slower yarn drawing speeds and vice versa.

SUMMARY OF THE INVENTION

It is an object of this invention to provide a process that assures, in a continuous sequence of operations, the production of continuous fibers and their association with a thermoplastic organic material, while avoiding certain constraints exhibited by the prior art.

It is a further object of this invention to provide a process whereby the amount of organic material associated with the reinforcement fibers is determined independently of the production conditions of the fibers.

It is a further object of the invention to provide a process which makes it possible to obtain directly a composite yarn or ribbon ready to be transformed into the finished product, where the respective percentages in the yarn or ribbon of thermoplastic organic material and reinforcement fibers correspond approximately to those of the finished product.

These objects are achieved by a process which includes drawing reinforcement fibers from a material in the molten state such as glass, and simultaneously driving in the form of yarns, or extruding and drawing in the form of a sheath or continuous fibers, at least one thermoplastic organic material, and then joining the reinforcement fibers and organic material to form a composite. The composite, as well as the glass reinforcement fibers and thermoplastic organic material, can be drawn and driven by a mechanical device.

The thermoplastic organic material can be associated with the reinforcement fibers in the form of a sheath or a multiplicity of fibers or continuous yarns distributed in one or more layers. The organic material can be in a particular form produced prior to using the process according to the invention. Thus, the organic material can be in the form of windings of continuous yarns.

Alternatively, the organic material can be shaped at the time the invention is used. Thus, the organic material can be extruded in the molten state and drawn mechanically in the form, for example, of a sheath or multiplicity of continuous fibers. In this case, the reinforcement fibers are put in contact with the extruded organic material when the surface of the latter is still in the sticky state; this makes it possible immediately to make the reinforcement fibers and organic material integral. The surface of the latter is in this state at temperatures generally above about 60° C.

Thermoplastic organic material is to be understood as a product formed from a single thermoplastic organic compound and copolymers or mixtures of such thermoplastic compounds. Thus, it can be a well-defined compound belonging, for example, to the family of polyolefins, polyamides or polyesters.

When windings of continuous yarns are used, these yarns can be formed from continuous fibers. Such yarns can be composed, for example, of nylon and polyethylene, whose distribution in said fibers can be very variable.

The organic material, regardless of the form in which it appears, and the reinforcement fibers may come in contact prior to their being joined or may converge without contact directly toward a common assembly zone, from which they are joined into a single yarn or ribbon driven mechanically by a suitable device. When the reinforcement fibers and the organic material are put in contact, the surface of the latter can be completely set or partially cured (i.e., sticky or tacky).

According to one embodiment of the invention, the reinforcement fibers previously assembled in the form of at least one yarn or remaining in the form of layer(s), come in contact with the organic material before they are joined to form a single yarn or a single ribbon.

According to another embodiment of the invention, the reinforcement fibers previously assembled in the form of at least one yarn or remaining in the form of layer(s) and the organic material converge toward a common assembly zone from which they are joined into a single yarn or ribbon driven mechanically by a suitable device.

When the organic material is used in the form of a multiplicity of fibers or continuous yarns, they are drawn or driven in the form of one or more layers.

When the layer is single, it can advantageously be drawn or driven, at least in its final path, in the form of a conical layer, whose vertex coincides with the point of junction with the reinforcement fibers.

Alternatively, the layer can be drawn or driven from a multiplicity of points distributed over a ring-shaped surface. The layer then moves in a volume delimited by two cones, whose bases are concentric and vertex is common. These points are those from which the fibers are formed by extrusion, as well as the points corresponding to a change of path of the yarns where they come from windings outside of the zone considered. There again, the vertex of the cones can coincide with the point of joining with the reinforcement fibers.

The organic fibers or yarns can be drawn or driven in several layers. These layers have come from a multiplicity of points distributed, for example, on arcs of a circle or ring portions. As above, these points correspond either to extrusion orifices of the fibers or to a change of path of the yarns. The various layers converge toward the point of assembly with the reinforcement fibers.

According to one embodiment of the invention, a first installation comprises at least one die which is fed molten material, such as glass. The die has a lower face provided with a multiplicity of orifices and, optionally, devices for coating, assembling, guiding and mechanically drawing the reinforcement fibers obtained from said die. A second installation comprises at least one die which is fed molten thermoplastic organic material under pressure. This die has a lower face provided with at least one orifice and, optionally, devices for coating and guiding the organic material. These two installations further comprise in common at least one device for assembly of the reinforcement fibers and the organic material in the form of a composite yarn or ribbon, at least one device for mechanically driving said yarn or ribbon and, optionally, devices for guiding, coating and treating the yarn or ribbon.

According to another embodiment of the invention, a first installation similar to that of the preceding device is used. A second installation comprises at least one series of windings of yarns of thermoplastic organic material distributed over supports, at least one device for guiding each yarn extracted from each winding, at least one guide device for at least a part of all said yarns and, optionally, a device for coating the yarns. These two installations further comprise in common at least one device for assembling said yarns and reinforcement fibers in the form of a composite yarn or ribbon, at least one device for mechanically driving said yarn or ribbon and, optionally, devices for guiding, coating and treating the yarn or ribbon.

The reinforcement fibers are drawn from a molten thermoplastic material, for example, a glass. In such case, production of the reinforcement fibers is as follows. A die of an alloy of precious metals is fed glass in the solid or molten state. This die, heated by Joule effect, melts the glass or keeps it in the molten state, and is provided at its base with a multiplicity of orifices, through which the glass flows in the form of streams mechanically drawn to the state of fibers.

In the particular case of the invention, the glass streams can be drawn by the same devices as those that drive or draw the organic material. If desired, different devices can be used. The drawing devices are the same when the reinforcement fibers remain in the form of layer(s) of separate fibers up to the zone of assembly where a composite yarn or ribbon is formed with the organic material.

The drawing devices are different when the reinforcement fibers are assembled in the form of at least one yarn before their contact with the organic material. Thus, the glass streams can be drawn in the form of at least one layer of fibers by an independent mechanical drawing device. Between the die and this device the reinforcement fibers are joined into at least one yarn by at least one assembly device, which also acts as a means for guiding the yarn. The drawing device which drives the yarn can serve to orient the path of the latter at the output of the device in question. The path given to the yarn can bring it in contact with the organic material before the common assembly zone. The path of the yarn can also converge directly toward the zone without prior contact. At least one device for mechanically driving or drawing the organic material is installed downstream from the assembly zone, and also serves to drive or draw the composite yarn or ribbon.

Where the devices for drawing the glass fibers and the organic material are different, it is possible to adjust the drawing speeds separately. When these speeds are identical, it is possible to obtain a composite yarn which results, for example, from the association of the organic yarns or fibers and glass fibers.

When these speeds are different, it is possible to obtain a composite ribbon. Thus, when the speed of drawing the glass fibers is greater than the speed of driving or drawing the organic material, the fibers, in the form of yarn, can be distributed over a certain width when they come in contact with the organic material. The drawing and driving speeds are most generally between about ten and thirty meters per second.

According to an advantageous mode of the invention, the organic material, regardless of the form in which it appears, comes to surround the reinforcement fibers while the composite yarn or ribbon is being made. This make-up makes it possible to avoid, or at least to reduce, an increase in brittleness of the glass fibers which results from rubbing or contacting solid surfaces.

The coating devices are capable of depositing on the reinforcement fibers and/or on the organic material, in one form or the other, sizes which have the object of protecting the surface of the glass fibers and/or promoting their bond with the product to be reinforced, finishes able to unite the various components of the composite yarn or ribbon, or a thermoplastic organic material in the molten state.

It follows from what has been said that the invention can be used by devices exhibiting numerous variants.

Thus, according to one embodiment of the invention, the reinforcement fibers assembled in at least one yarn, and the fibers or yarns of organic material, are wound immediately after their joining on a rotating support. The winding of the composite yarn thus obtained will be formed by a purely physical assembly of different yarns or fibers.

The various embodiments of the invention can comprise other devices that are specific to the desired method of bonding between the reinforcement fibers and organic material and/or to the make-up of the desired semifinished product.

Thus, according to a second embodiment of the invention, the reinforcement fibers, for example glass fibers, are coated with a finish able to react under the action of actinic radiation, before causing a contact with the yarns or fibers of organic material. Actinic radiation should be understood as all radiation able to produce chemical reactions, such as ultraviolet radiation emitted by a laser beam or an electronic beam. The embodiment comprises, in addition to the device producing the assembly of said yarns or fibers into at least one composite yarn, a device subjecting the composite yarn, over a part of its path, to the action of ultraviolet radiation, for example. This radiation has the effect of polymerizing, at least in part, the finish then distributed on the reinforcement fibers and organic fibers and thus chemically causes the fibers to become integral. The composite yarn thus obtained is driven mechanically by a rotating support on which a continuous winding is formed.

According to a third embodiment of the invention, a variant of the preceding one, the composite yarn is driven mechanically by a cutting machine which continuously delivers a cut composite yarn.

According to a fourth embodiment of the invention, another variant of the second, the continuous composite yarn is driven mechanically by a device that distributes it uniformly on a conveyor belt.

According to a fifth embodiment of the invention, a device subjects the composite yarn, over a part of its path, to the action of a heat treatment. Raising the temperature is sufficient to cause softening of the organic fibers. A simple cooling then makes it possible to make the elements constituting the composite yarn integral.

As above, this latter installation can be equipped with devices that particularly make it possible to wind the composite yarn, to cut it, or to distribute it on a conveyor belt.

BRIEF DESCRIPTION OF THE DRAWINGS

The process according to the invention and the means assuring its use will be better appreciated from the following detailed description, illustrated by the accompanying drawings, in which.

DETAILED DESCRIPTION OF THE PREFERRED EMBODIMENT

Figure 1:
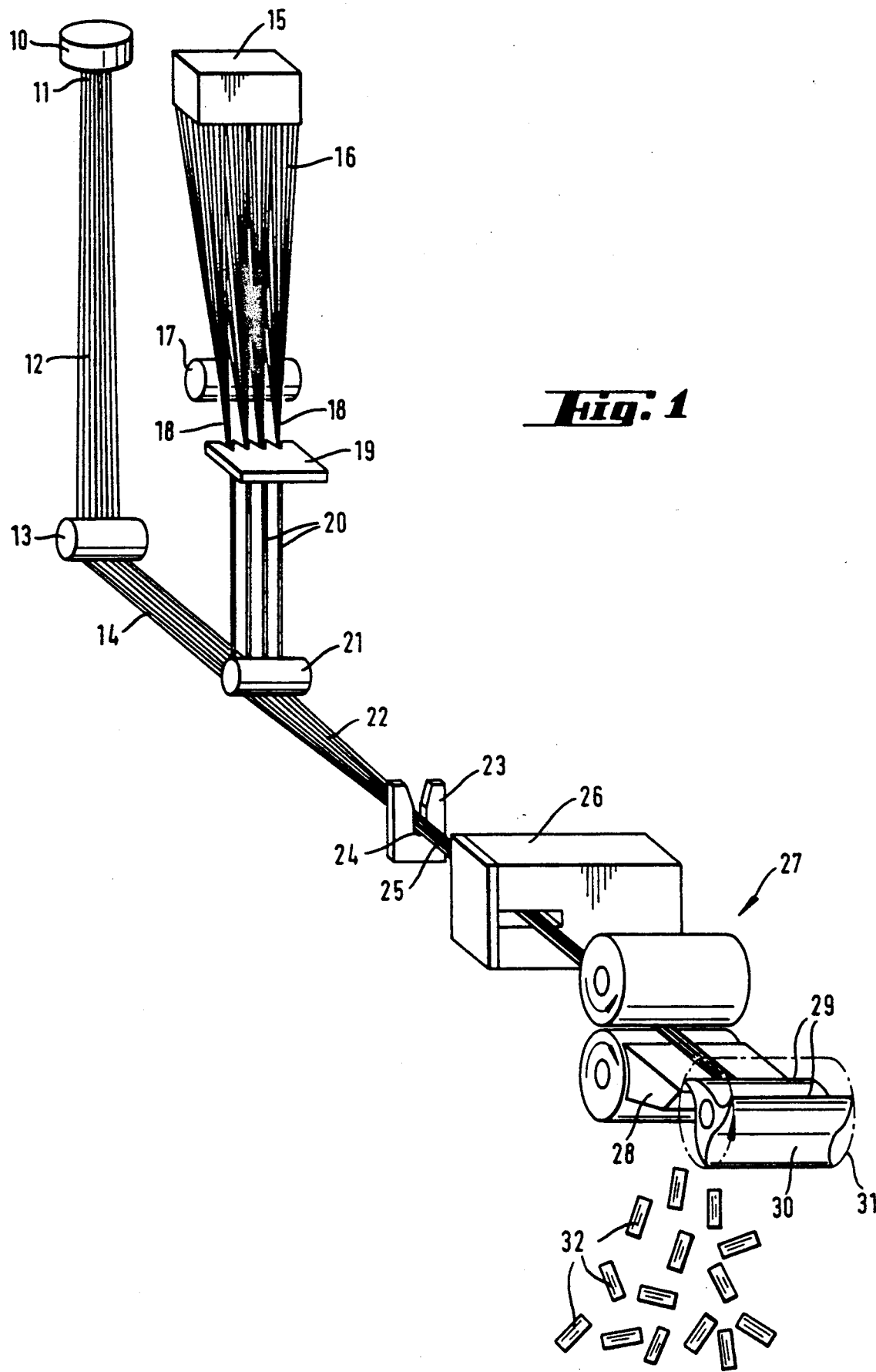
FIG. 1 shows a perspective view of a first embodiment of the invention.

FIG. 1 represents the association of two components, the one producing organic fibers and the other producing glass fibers, each reduced to their sole fiber drawing device.

The first component comprises a set of devices using the molten process, which is well known to producers of synthetic fibers. The thermoplastic polymer, for example a polyamide in the form of granules, is stored in a hopper which feeds, for example, a vertical extruder. The polymer is melted in this extruder, then transported in this state to a fiber-drawing head which distributes it to a die 10. Under the pressure exerted, polymer flows from multiple orifices of the die in the form of fluid jets 11 which are mechanically drawn and cooled in the form of a multiplicity of continuous fibers 12. These fibers are guided by roll 13 which has the effect, particularly, of presenting fibers 12 in the form of an approximately plane layer 14.

The second component comprises a set of devices making it possible to obtain, by mechanical drawing, continuous glass fibers. A die 15 is normally connected to a glass feed source. This source can be the front part of a furnace which directly routes the molten glass to the top of die 15; it can also be a hopper containing cold glass, obtained and stored, for example in the form of beads, which feeds the die by simple gravity. In both cases, die 15 is generally of platinum-rhodium alloy, and heated by Joule effect. This die makes it possible to remelt the glass or to keep it at high temperature for it to reach a viscosity suitable for its drawing.

A stream of molten glass flows from numerous orifices located at the base of the die. These glass streams are immediately drawn into continuous multiple fibers 16. These fibers are then coated with a finish by a device such as roll 17. This device can consist of a tank continuously fed with a finish bath, in which the lower part of a rotating roll bathes. This roll is covered with a film of finish, which fibers 16 pick up during passage while coming in contact with its surface.

These fibers can be distributed in several layers 18 due to at least one assembly device 19. This device is generally provided with notches, at the bottom of which the fibers of each layer are assembled to produce to a yarn. In the example represented, device 19 is provided with four notches separating fibers 16 into as many layers 18 and producing four yarns 20.

These yarns are guided by a device 21, shown as a roll, and which also acts as a guide for layer 14 of organic fibers. This roll 21 assures the contact between these fibers and yarns 20 to form only a single layer 22. This single layer converges toward an assembly device 23 which causes the physical joining of fibers 12 and yarns 20 and forms a composite yarn 23. This joining can be obtained by passage of layer 22 in a notch 24 with which device 23 is provided.

Fibers 16 are coated with a finish comprising at least a photoinitiator, able to initiate a chemical transformation of said finish under the action of actinic radiation. U.S. patent application Ser. No. 07/313,347, filed Feb. 17, 1989, the content of which is expressly incorporated herein by reference thereto, describes finish formulas that can be used within the framework of this invention, such as those defined in examples 8 and 12 of that application. The finish, initially deposited on separate glass fibers, gives a certain cohesion to yarn 20 then to composite yarn 25. Shortly after its production, yarn 25 passes into a device 26 in which it is subjected to the action of ultraviolet radiation. This radiation causes the transformation of the finish which is in contact, at least locally, with yarns and fibers which constitute composite yarn 25; this transformation has the effect of increasing the cohesion of the composite yarn obtained.

Yarn 25, and further, organic fibers 12 and glass fibers 16 are drawn and driven mechanically by a single device 27. This device is formed by a pair of rotary rolls rotating in opposite directions and working together to drive yarn 25 by friction. At the output of device 27, yarn 25 passes onto a counterblade device 28. The edge of this device works with blades 29, driven by a rotary roll 30 enclosed in a protective cover 31. Yarn 25 is thus cut into sections 32 of uniform length. The length of the sections and that of the fibers that they contain are approximately equal. To the extent that the invention makes it possible to adjust precisely the percentages of organic material and of glass fibers, it is possible to obtain sections whose composition is exactly that of the desired finished composite product. Such sections can thus be used directly as granules in a production process such as molding of pieces by extrusion.

Figure 2:
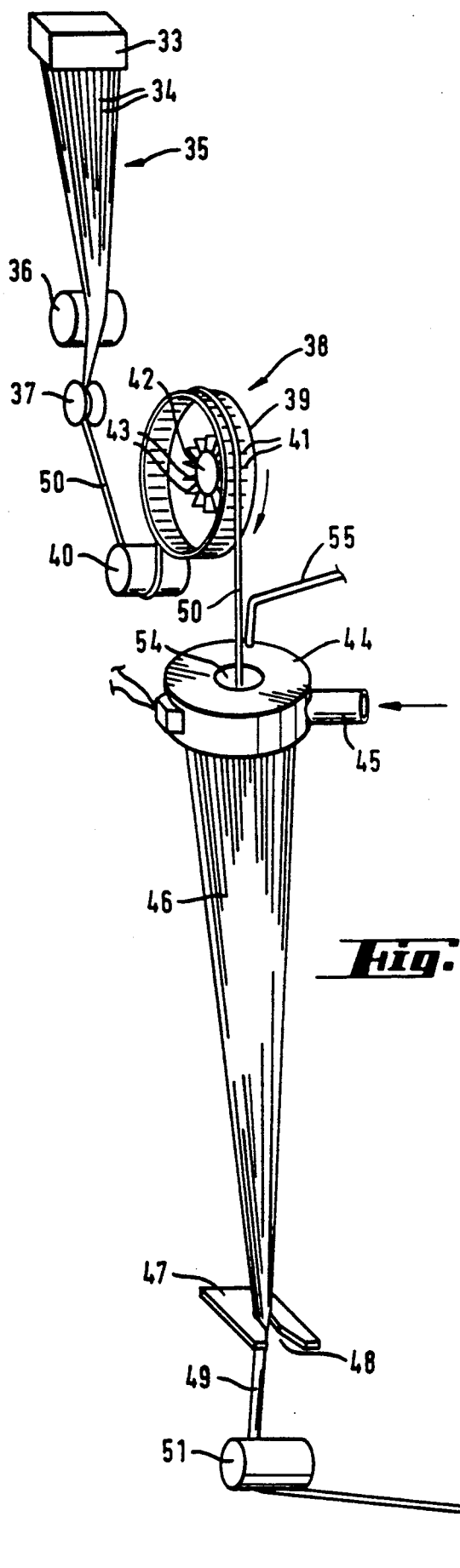
FIG. 2 shows a perspective view of a second embodiment of the invention.

FIG. 2 represents another example of association of two components making it possible to use the invention.

The first component makes it possible to produce continuous glass fibers. As in the preceding example, it comprises a die 33, identical with die 10 described above and functioning in the same way. Multiple glass fibers 34, obtained by mechanical drawing, are grouped into a single layer 35 which passes over a sizing device, shown as roll 36. The size deposited by this device has the object of promoting the adherence of the glass fibers to the organic material. Numerous formulations of size of this type are known, such as those described in French patent publication 2,167,771.

After being coated with size, fibers 34 are joined in a single yarn 50 by an assembly device 37; this device including a small wheel with a groove. Yarn 50, and further, fibers 34 are driven and drawn mechanically by a device 38 driven in a rotating movement by a motor (not shown). This well-known device is described in detail in the patent U.S. Pat. No. 3,265,482, and includes a drawing wheel 39 and a device 40 for guiding the yarn. Device 40 is installed to flatten yarn 50 on the periphery of wheel 39 over a length sufficient to cause winding of said yarn by simple friction. The periphery of wheel 39 comprises a series of regularly spaced crosswise slots 41.

A second wheel 42, with a smaller diameter than wheel 39 and provided on its periphery with radiating fins 43, is installed inside said wheel. Wheel 42 is eccentric relative to wheel 39 so that the ends of fins 43 go through slots 41. Wheel 42 is driven in a rotational movement synchronized with that of wheel 39, with a transmission device or mechanical connecting device (not shown). Under the joint action of wheels 39 and 42, yarn 50 is driven mechanically, then separated from wheel 39 by fins 43. From its separation zone, the yarn follows a path approximately tangential to wheel 39. The projected yarn path can thus be determined with precision by consequently selecting the position of wheel 42.

The second component is similar to that described in the preceding example; it also comprises means for storage of a thermoplastic polymer in the form of granules, means for melting said polymer and its transportation under pressure, in the molten state, to a die 44. The intake of the polymer is shown as duct 45.

Die 44 is an annular die, provided with a central passage 54 through which yarn 50 is projected. The annular base of this die is perforated with a multiplicity of orifices uniformly distributed over its entire surface. By extrusion, then mechanical drawing, a layer 46 is formed appearing on the outside like a cone whose point is directed downward Yarn 50 is projected in the axis of said cone, the point of which corresponds to the zone of assembly of all the organic fibers forming layer 46 and said yarn 50.

An assembly device 47, provided with a simple notch 48, causes the physical joining of yarn 50 and layer 46 and produces a single composite yarn 49.

After guiding by device 51, yarn 49 is wound directly on a rotating support (not shown). Yarn 49 is distributed on this support by a yarn guide device, shown as notched plate 52, driven in a back-and-forth movement diagramed by the double arrow. The product obtained is a winding with straight sides 53.

This component may include a second surface treatment of the fibers. Thus, it is possible to install a nozzle 55 whose end is directed toward the passage made in the center of die 44. A reactive mixture, as already described, can be sprayed through this nozzle. The sprayed droplets are entrained toward the interior of layer 46 because of air currents induced by the movement of yarn 50 and the organic fibers, and are deposited on their surface. The winding of the composite yarn thus obtained can be used directly to make different products.

Thus, a layer of several continuous composite yarns can be wound on a support, according to the so-called process by winding. When the winding of the yarns is completed, they are subjected to a heat treatment which causes the melting of the organic material. Solidifying of the unit and therefore the cohesion of the final piece is obtained by its natural or controlled cooling.

This continuous composite yarn can be used to make fabrics; these fabrics can be transformed into rigid plates after heat treatment and subsequent cooling.

This composite yarn can also be used to make pieces by pultrusion. A layer of composite yarns is guided toward a zone where said yarns are joined, made integral, then formed by melting the organic material.

Figure 3:
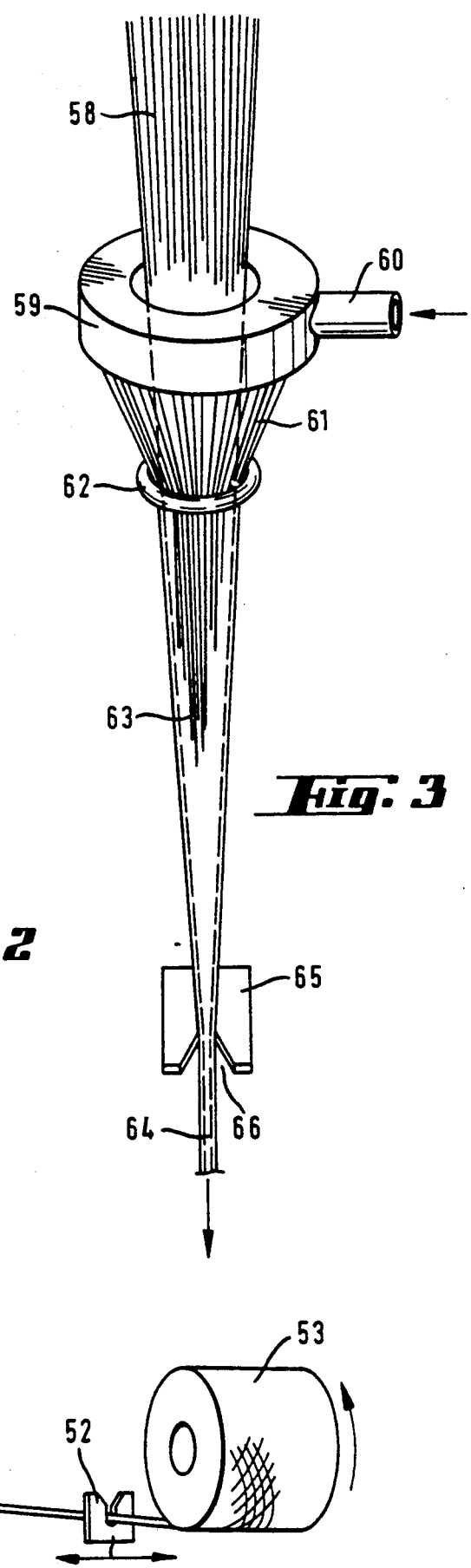
FIG. 3 is a perspective view showing part of an embodiment considered as a variant of the preceding one.

FIG. 3 represents a variant of the preceding embodiment. The devices for assembly, guiding and drawing the glass fibers have been eliminated. A layer of glass fibers 58 arrives directly (after having optionally been coated with a finish) into a passage made in the center of an annular die 59. This die is identical, with its feed duct 60, to die 44 of FIG. 2.

This die delivers a layer 61 of organic fibers which is constricted by a guide ring 62. Placement of this ring and/or its diameter are defined to gather the glass fibers and organic fibers into a single cone 63. In this way, a part of the glass fibers will be in contact with the organic fibers. As in the preceding example, the various fibers are assembled in a single composite yarn 64 with an assembly device 65 provided with a notch 66. Yarn 64 is driven mechanically by a device (not shown) which causes the common drawing of the glass fibers and organic fibers.

The orifices placed at the base of dies 44 and 59 can be distributed in a circle and will produce a layer limited to a simple cone, or else on a continuous annular zone, thus delivering a layer delimited between two cones with the same vertex and concentric bases. The orifices can also be distributed, for example, between two quite distinct zones which produce two separate layers converging toward the assembly zone.

Figures 4, 5:
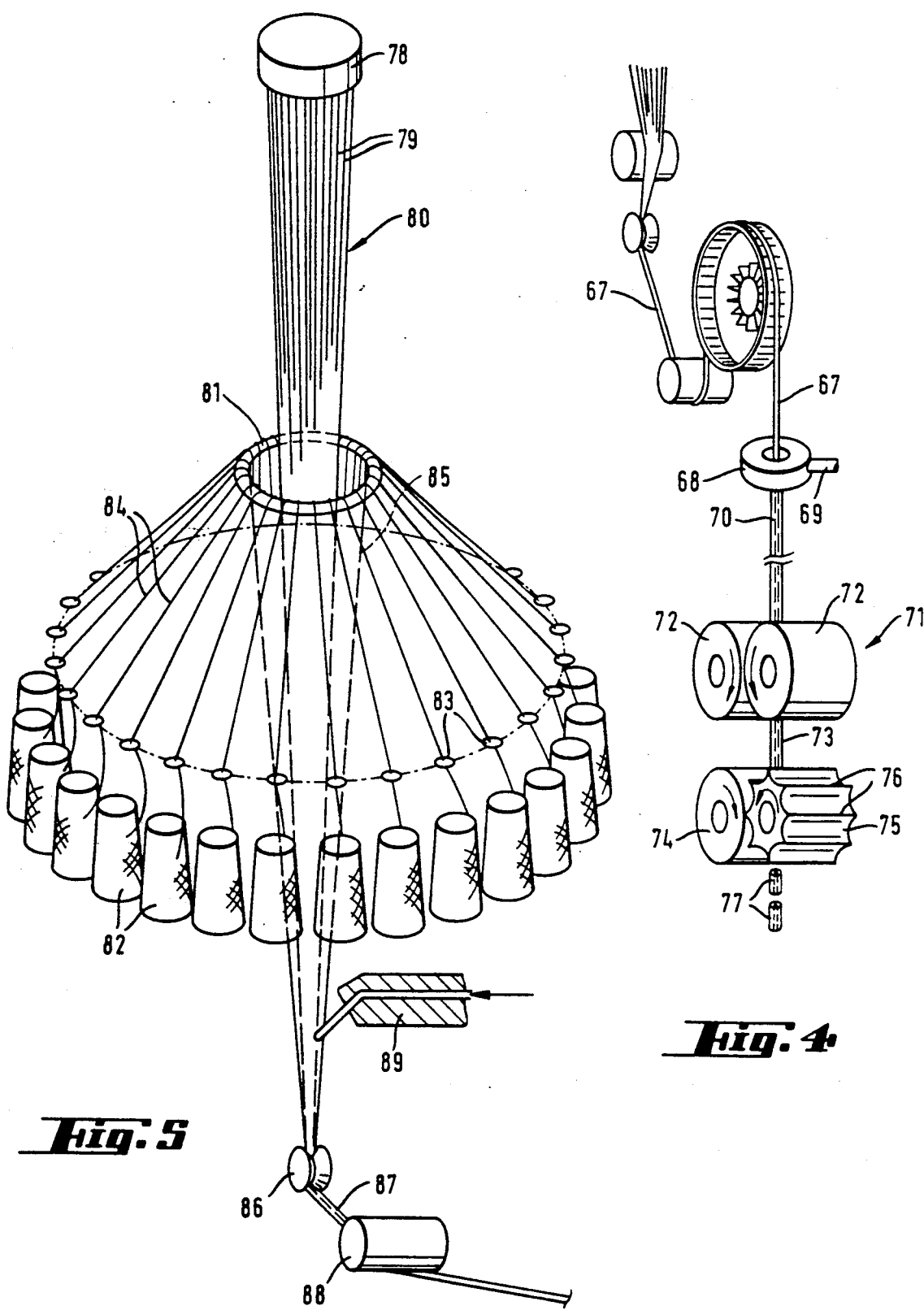
FIG. 4 is a perspective view showing a part of an embodiment considered as a variant of the embodiment illustrated by FIG. 3.
FIG. 5 is a perspective view showing a third embodiment of the invention.

Another variant of the embodiment illustrated by FIG. 2, is illustrated by FIG. 4 whereby the annular die delivers a continuous sheath instead of fibers. According to this figure, the continuous glass fibers are drawn, then assembled and driven in the form of a yarn 67 as described above. This yarn passes through the passage located in the center of annular die 68, fed molten polymer by duct 69. The base of this die 68 is provided with a circular nozzle through which the polymer is extruded, then drawn mechanically in the form of a continuous sheath 70. This sheath and yarn 67 come in contact at the level of drawing and assembly device 71. This device comprises two rotary rolls 72 rotating in opposite directions; these rolls work together to draw and roll sheath 70 and yarn 67 to form a composite ribbon 73. This ribbon is driven by a cutting machine comprising an anvil roll 74 and a roll 75 provided on its periphery with blades 76 and cut into sections 77. The speed of drawing yarn 67 can be greater than that of sheath 70; in this case, the yarn is projected against the inside wall of the sheath before their assembly.

FIG. 5 represents another way of associating two components making possible the embodiment of the invention shown. The first component for producing the glass fibers is similar to that described in the preceding embodiments. It also comprises a die 78 functioning in the same way as dies 15 and 33 represented in FIGS. 1 and 2. The multiple glass fibers 79, obtained by mechanical drawing, are grouped here in a single layer 80. The devices for assembly, guiding and drawing of fibers 79 are eliminated. Layer 80 passes directly through a circular frame 81.

The second component is made up of devices that store, guide and distribute the organic material available in a particular form. The organic material is in the form of a multiplicity of windings 82 that are uniformly placed on one or more supports (not shown). These supports comprise guide devices 83, at a rate of one device per winding. The end of these devices can consist of a simple metal rod bent on itself in the shape of a loop, shown here by a circular line. From each winding 82 a yarn 84 is extracted by outside unwinding. Yarns 84 are guided individually by devices 83, then collectively by frame 81.

In FIGS. 3 and 4, glass fibers 79 and organic fibers 84 are drawn and driven mechanically by a single device (not shown). Under the action of this device, yarns 84, guided by frame 81, form a conical layer 85. Layers 80 and 85 meet and are joined at the level of common assembly device 86. The assembly device used in this example is a simple small wheel provided with a groove. Composite yarn 87 thus obtained, after having been guided by a device 88, is driven mechanically by a device, not represented, which also serves to draw fibers 79 and yarns 85.

A nozzle 89 can be placed in the immediate vicinity of assembly device 86. By this nozzle, a reactive finish, such as described above, can be sprayed inside layers 80 and 85. Also by this means, it is possible to inject, inside said layers, a thin stream of thermoplastic organic material in the molten state.

Frame 81 can obviously have other shapes, for example, that of a square. In this case, yarns 84 can be distributed in four converging plane layers.

The device for guiding the organic fibers need not necessarily surround the reinforcement fibers. Thus, in the example illustrated by FIG. 1, die 10 can be replaced by a multiplicity of windings of yarns, whose guide devices will produce one or more plane layers converging, as in layer 14, toward layer of yarns 20.

We claim:

1. A process of production of a composite yarn or ribbon, comprising:
    drawing reinforcement fibers from molten glass;
    directing thermoplastic organic material around said reinforcement fiber for contact therewith;
    forming a yarn or ribbon from the reinforcement fibers and thermoplastic organic material; and
    collecting the yarn or ribbon.

2. The process according to claim 1, wherein the thermoplastic organic material is partially cured when contacting the reinforcement fibers.

3. The process according to claim 1, wherein a plurality of reinforcement fibers are joined to form at least one yarn before contact with the thermoplastic organic material.

4. The process according to claim 1, which further comprises arranging the reinforcement fibers in at least one layer prior to contacting the thermoplastic organic material.

5. The process according to claim 1, which further comprises coating the reinforcement fibers with a finish of at least one photoinitiator and subjecting the composite yarn or ribbon to actinic radiation for curing of said finish.

6. The process according to claim 1, which further comprises coating the thermoplastic organic material with a finish of at least one photoinitiator and subjecting the composite yarn or ribbon to actinic radiation for curing said finish.

7. The process according to claim 1, which further comprises contacting the reinforcement fibers and thermoplastic organic material at the point where the yarn or ribbon is formed.

8. The process according to claim 1, which further comprises contacting the reinforcement fibers and thermoplastic organic material a point substantially upstream of the point where the yarn or ribbon is formed for alignment thereof prior to formation of the yarn or ribbon.

9. The process according to claim 1, which further comprises heating the composite yarn or ribbon to soften the thermoplastic organic material sufficiently to make it integral with the reinforcement fibers.

10. An apparatus for producing a yarn or ribbon from the combination of glass reinforcement fibers and at least one thermoplastic organic material, which comprises:
    means for providing glass fibers, having a lower face with a multiplicity of orifices;
    means for providing thermoplastic organic material, having a lower face with at least one orifice;
    means for directing said thermoplastic organic material around said glass fibers; and
    means for forming a composite yarn or ribbon from the glass fibers and thermoplastic organic material.

11. An apparatus according to claim 10, wherein the thermoplastic organic material providing means has a generally central opening for receiving said glass fibers.

12. An apparatus according to claim 11, wherein the thermoplastic organic material providing means is an annular die and wherein the lower face includes at least one nozzle.

13. An apparatus according to claim 11, wherein the thermoplastic organic material providing means is an annular die and wherein the lower face includes a multiplicity of orifices uniformly distributed in an annular configuration.

14. An apparatus according to claim 11, wherein the thermoplastic organic material providing means is an annular die wherein the lower face includes a multiplicity of orifices uniformly distributed in at least two annular configurations.

15. An apparatus according to claim 10, further comprising means for subjecting the composite yarn or ribbon to the action of actinic radiation.

16. An apparatus according to claim 10, further comprising means for heating the composite yarn or ribbon.

17. An apparatus for producing a yarn or ribbon from the combination of glass reinforcement fibers and at least one thermoplastic organic material, which comprises:
   means for providing glass reinforcement fibers, having a lower face with a multiplicity of orifices;
   means for providing series of windings of yarns of thermoplastic organic material;
   at least one guide device for each winding of yarn;
   at least one guide device for said series of windings;
   means for directing said thermoplastic organic material around said glass fibers; and
   means for forming a composite yarn or ribbon from the yarns of thermoplastic organic material and the reinforcement fibers.

18. An apparatus according to claim 17, wherein the guide device for the organic yarns is a frame and includes means for receiving the glass reinforcement fibers.

19. An apparatus according to claim 17, further comprising means for subjecting the composite yarn or ribbon to the action of actinic radiation.

20. An apparatus according to claim 17, further comprising means for heating the composite yarn or ribbon.

21. A process of production of a composite yarn or ribbon, comprising:
   drawing reinforcement fibers from molten glass at a first speed;
   directing continuous thermoplastic organic material towards said reinforcement fiber for contact therewith;
   forming a yarn or ribbon from the reinforcement fibers and thermoplastic organic material;
   drawing the yarn or ribbon at a second speed; and
   collecting the yarn or ribbon.

22. An apparatus for producing a yarn or ribbon from the combination of glass reinforcement fibers and at least one thermoplastic organic material, which comprises;
   means for providing glass fibers, having a lower face with a multiplicity of orifices;
   means for drawing said glass fibers;
   means for providing continuous thermoplastic organic material, having a lower face with at least one orifice;
   means for directing said thermoplastic organic material toward said glass fibers;
   means for forming a composite yarn or ribbon from the glass fibers and thermoplastic organic material; and
   means for drawing said composite yarn or ribbon.

23. An apparatus for producing a yarn or ribbon from the combination of glass reinforcement fibers and at least one thermoplastic organic material, which comprises;
   means for providing glass reinforcement fibers, having a lower face with a multiplicity of orifices;
   means for drawing said glass fibers;
   means for providing series of windings of yarns of continuous thermoplastic organic material;
   at least one guide device for each winding of yarn;
   at least one guide device for said series of windings;
   means for forming a composite yarn or ribbon from the yarns of thermoplastic organic material and the reinforcement fibers; and
   means for drawing said composite yarn or ribbon.

* * * * *